(12) United States Patent
Lee

(10) Patent No.: US 11,547,971 B2
(45) Date of Patent: Jan. 10, 2023

(54) CERAMIC FILTER MEMBRANE MODULE

(71) Applicant: NANO HWYNE CO., LTD., Gimje-si (KR)

(72) Inventor: Geun Ho Lee, Jeonju-si (KR)

(73) Assignee: NANO HWYNE CO., LTD., Gimje-si (KR)

( * ) Notice: Subject to any disclaimer, the term of this patent is extended or adjusted under 35 U.S.C. 154(b) by 48 days.

(21) Appl. No.: 16/963,222

(22) PCT Filed: Jan. 18, 2019

(86) PCT No.: PCT/KR2019/000738
§ 371 (c)(1),
(2) Date: Jul. 18, 2020

(87) PCT Pub. No.: WO2019/143165
PCT Pub. Date: Jul. 25, 2019

(65) Prior Publication Data
US 2021/0046425 A1 Feb. 18, 2021

(30) Foreign Application Priority Data
Jan. 18, 2018 (KR) .................. 10-2018-0006526

(51) Int. Cl.
*B01D 63/04* (2006.01)
*B01D 71/02* (2006.01)
*B01D 69/04* (2006.01)

(52) U.S. Cl.
CPC ......... *B01D 63/043* (2013.01); *B01D 69/043* (2013.01); *B01D 69/046* (2013.01);
(Continued)

(58) Field of Classification Search
CPC .. B01D 63/043; B01D 71/022; B01D 71/028; B01D 2313/04; B01D 2313/12;
(Continued)

(56) References Cited

U.S. PATENT DOCUMENTS

| | | | |
|---|---|---|---|
| 6,958,120 B2 * | 10/2005 | Blase | ........... B01D 71/024 210/321.82 |
| 2003/0038092 A1 | 2/2003 | Gershenson | |

(Continued)

FOREIGN PATENT DOCUMENTS

| | | |
|---|---|---|
| CN | 202289887 U | 7/2012 |
| CN | 104994939 A | 10/2015 |

(Continued)

*Primary Examiner* — Krishnan S Menon
(74) *Attorney, Agent, or Firm* — Maschoff Brennan

(57) ABSTRACT

A ceramic filter membrane module enables a fluid to be filtered, such as raw water, with higher efficiency using multiple ceramic filters in a housing. As the diameter of a through-hole located at the center is considerably larger than the diameter of the surrounding flow path, water pressure pushing the raw water is applied from the through-hole at the center toward the outside of a filter body, such that the raw water passes through the filter body smoothly, thereby improving the purification efficiency and uniformly setting the overall flow direction of the raw water. As packing members are installed and fixed between the housing and the ceramic filters, sealing of the incoming raw water and the filtered water becomes more effective, such that the risk of leakage is reduced. As a plurality of ceramic filters are housed in a single housing, economic benefit can be achieved.

4 Claims, 7 Drawing Sheets

(52) U.S. Cl.
CPC ......... *B01D 71/022* (2013.01); *B01D 71/028* (2013.01); *B01D 2313/04* (2013.01); *B01D 2313/12* (2013.01); *B01D 2319/04* (2013.01)

(58) Field of Classification Search
CPC .............. B01D 2319/04; B01D 71/024; B01D 63/066; B01D 63/00; B01D 65/00; B01D 71/02
See application file for complete search history.

(56) References Cited

U.S. PATENT DOCUMENTS

| | | | | |
|---|---|---|---|---|
| 2015/0008180 | A1* | 1/2015 | Uchikawa | B01D 71/04 96/11 |
| 2016/0074795 | A1* | 3/2016 | Prehn | B01D 46/60 55/529 |

FOREIGN PATENT DOCUMENTS

| | | |
|---|---|---|
| JP | 2002143655 A | 5/2002 |
| JP | 2002-143655 A | 5/2005 |
| KR | 10-0712943 B1 | 12/2005 |
| KR | 10-2007-0116330 A | 12/2007 |
| KR | 20070116330 A | 12/2007 |
| KR | 10-2011-0090650 A | 8/2011 |

* cited by examiner

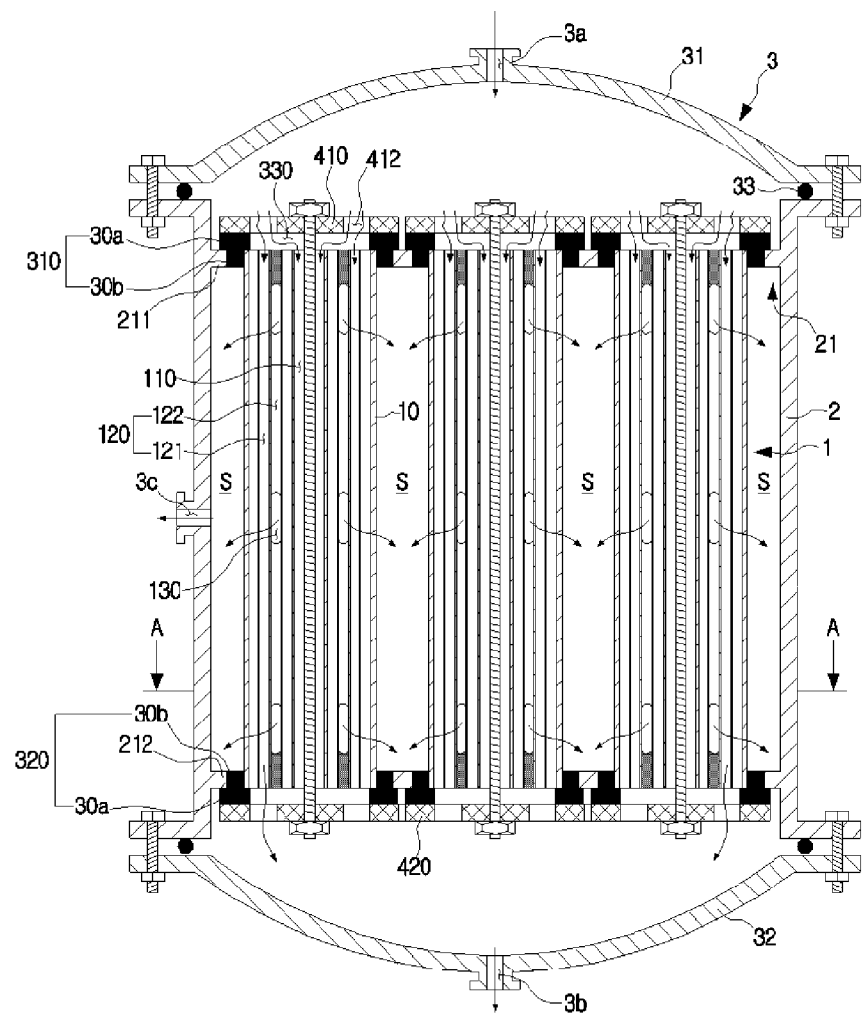
[FIG.1]

[FIG.2]
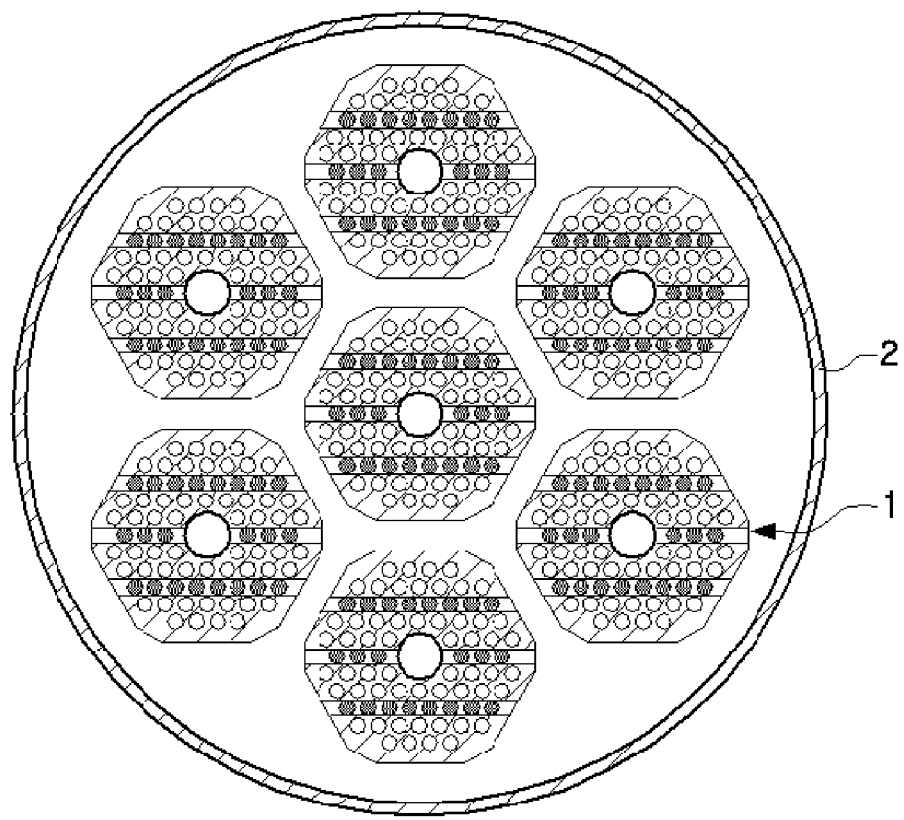

[FIG.3]
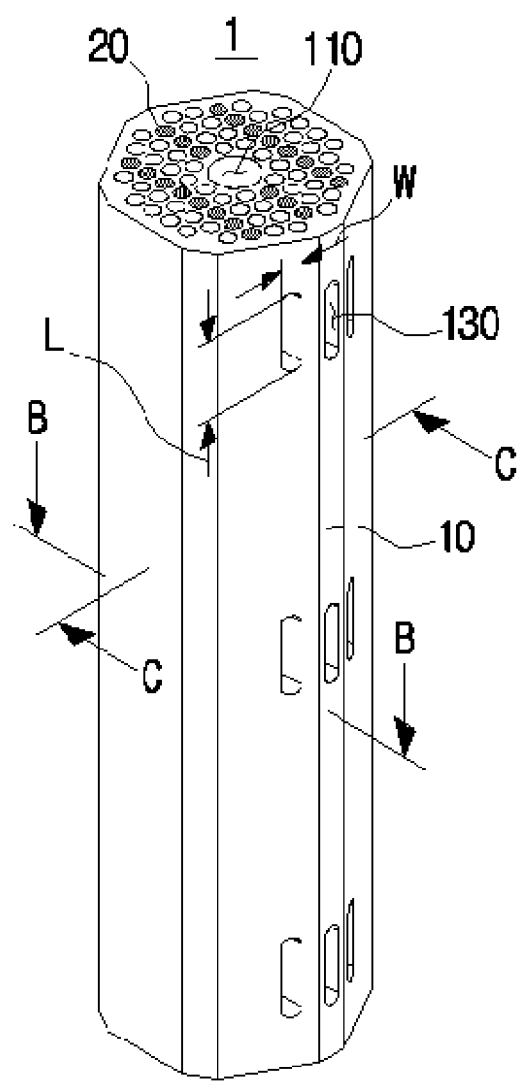

[FIG.4]
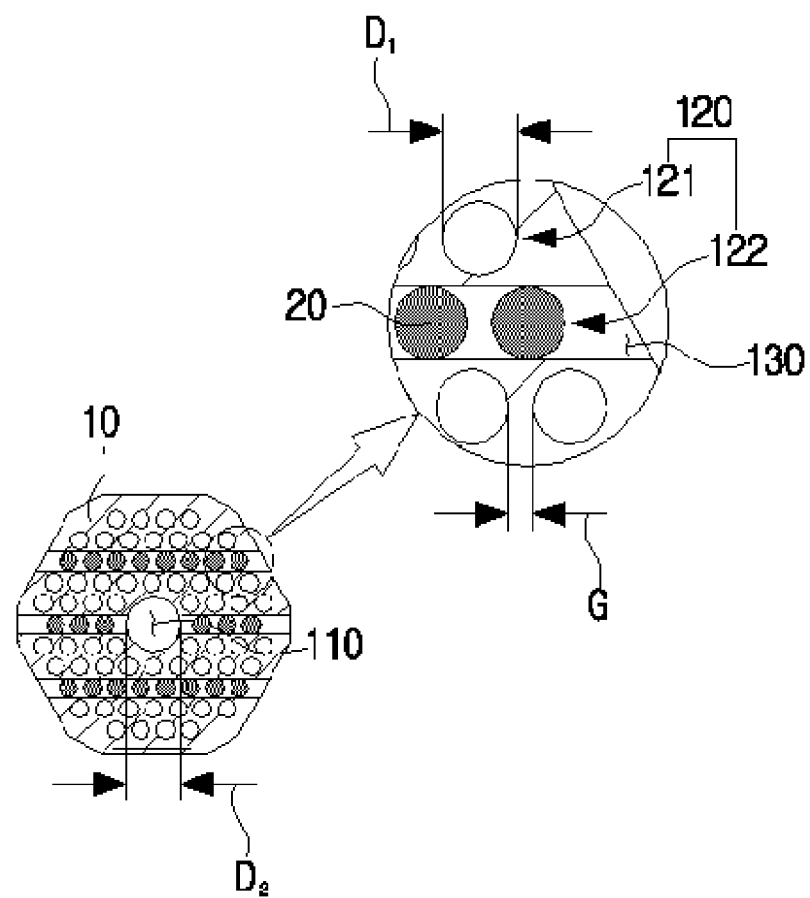

[FIG.5]
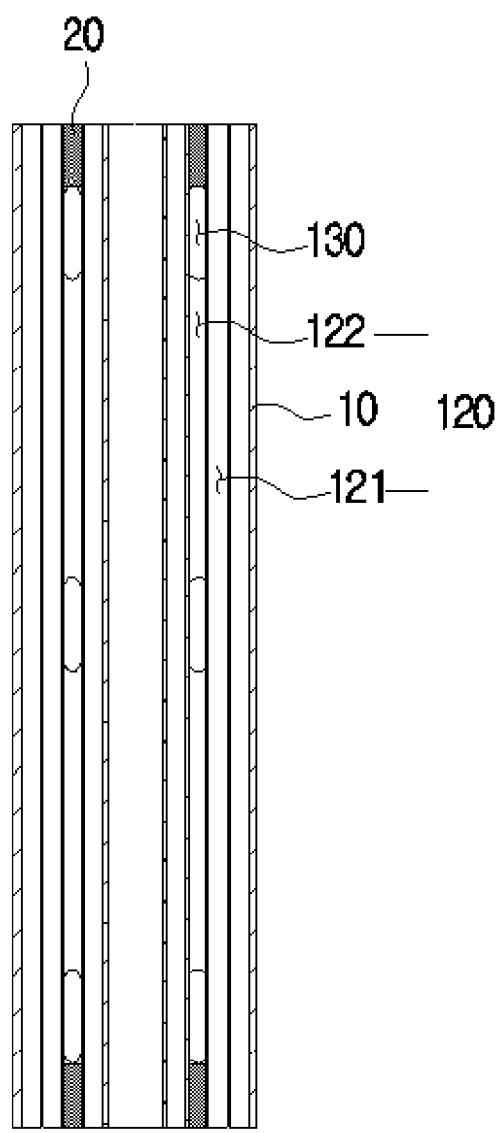

[FIG.6]
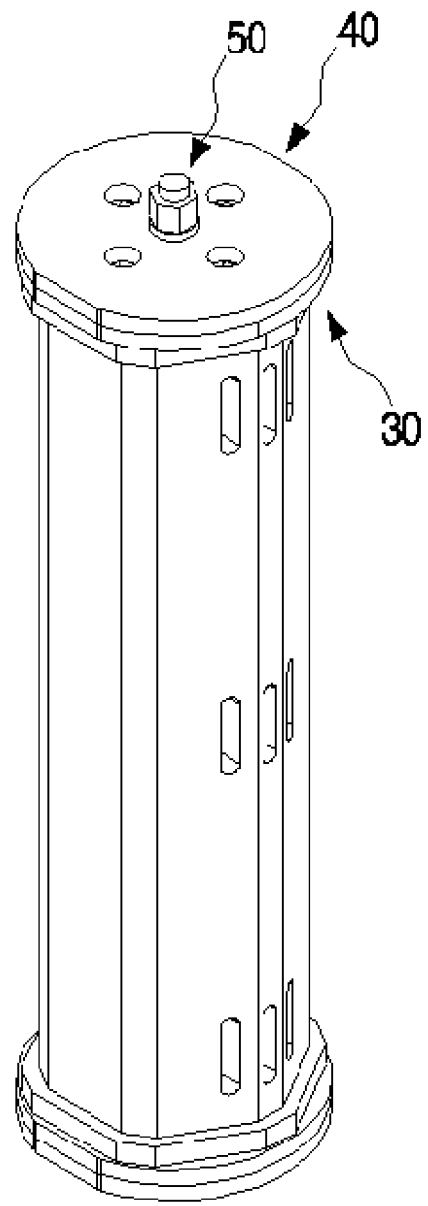

[FIG.7]
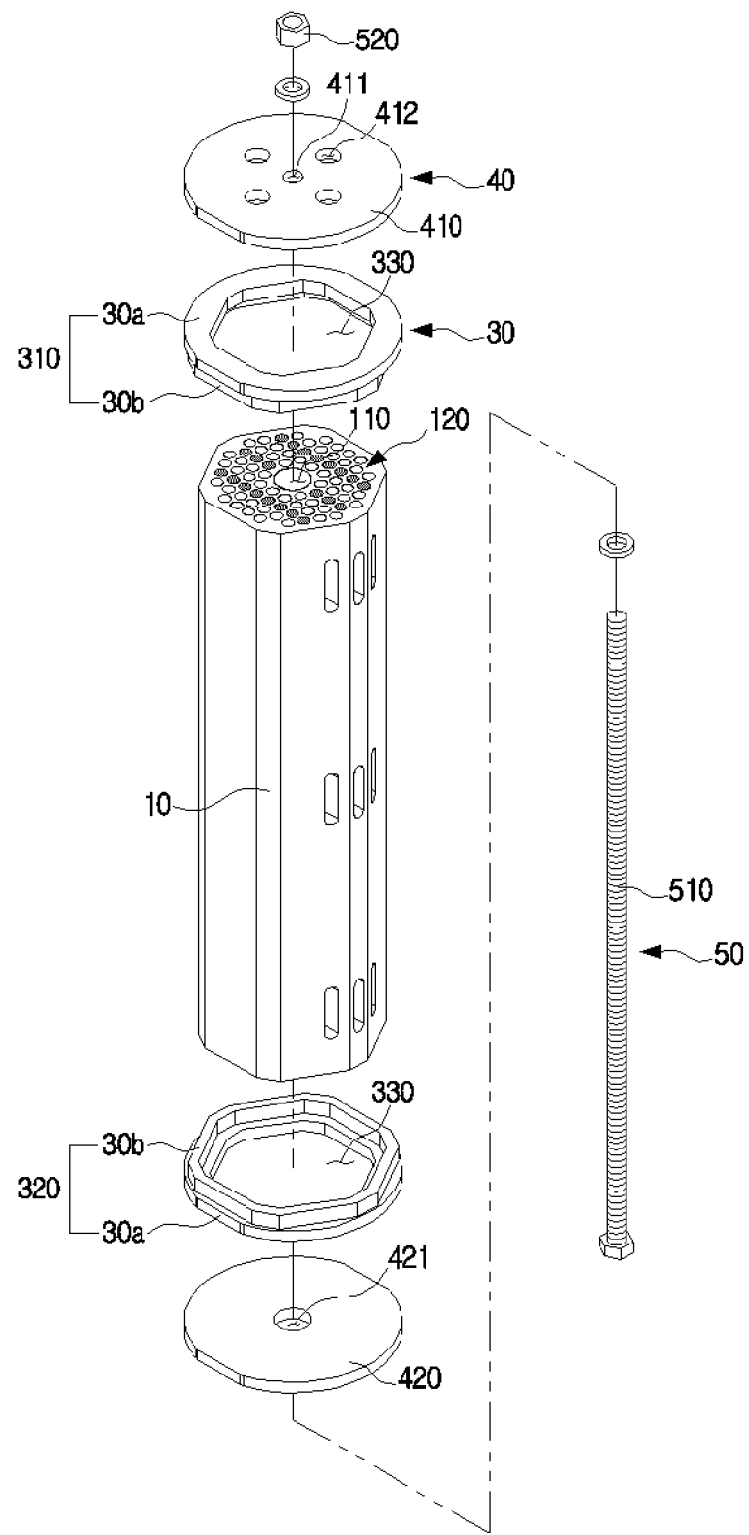

CERAMIC FILTER MEMBRANE MODULE

TECHNICAL FIELD

The present invention relates to a ceramic filter membrane module, wherein a plurality of ceramic filters accommodated inside a housing are installed in one housing to increase a capacity of a fluid to be filtered, such as raw water, etc., by the number of ceramic filters, wherein the ceramic filter membrane module includes a ceramic filter having a body of a column-shaped ceramic filter, a plurality of small through-holes passing through both sections of the body, and one large through-hole formed at a center, so that a water pressure pushing the raw water is applied from a center toward an outer lateral side when the raw water is filtered through a through-hole at a section of one side toward the outer lateral side, and thus the raw water can pass through the filter body more smoothly as whole, thereby improving the purification efficiency of the raw water and setting the overall flow direction of the raw water passing through the filter body, and wherein each packing member is installed and fixed between an external housing of the ceramic filter accommodated therein and the ceramic filter, so that sealing of the introduced raw water and the filtered water becomes more effective, thereby remarkably reducing the risk of leakage with high reliability of filtration and economic efficiency

BACKGROUND ART

Ceramic filters are excellent in heat resistance, durability, stain resistance, corrosion resistance and the like compared to organic polymer membrane filters, and thus widely used in various fields of business as a filter for various kinds of water treatment and liquid or gas filtration. Accordingly, the ceramic filters are useful in wide and various fields of industry.

The ceramic filters have a shape of flat plate, tube, hollow monolith, etc., and are used in various ways, such as having a filtration type like a pressure-resistant type, an immersion type or the like. However, in order to maximally increase filtration area per unit volume, a ceramic filter, which is a hollow monolith type formed with a countless number of through-holes passing through both sections of a cylindrical porous ceramic supporter, has been commercially used as shown in Patent Document 1 (Japanese Patent No. 2002-143655).

However, most of the ceramic filters presented in the above Patent Document 1 are designed to be equipped with only one monolith filter in one filter module (housing). Thus, in case of facilities requiring a large amount of water treatment, for example, water purification plants, it is required to install a large number of modules with a need for wide space, thereby causing a significant problem in an economic aspect.

DISCLOSURE

Technical Problem

To solve the above problems, an object of the present invention is to provide a ceramic filter membrane module, wherein a plurality of ceramic filters accommodated inside a housing are installed in one housing to increase a capacity of a fluid to be filtered, such as raw water, etc., by the number of ceramic filters, wherein the ceramic filter membrane module includes a ceramic filter having a body of a column-shaped ceramic filter, a plurality of small through-holes passing through both sections of the body, and one large through-hole formed at a center, so that a water pressure pushing the raw water is applied from a center toward an outer lateral side when the raw water is filtered through a through-hole at a section of one side toward the outer lateral side, and thus the raw water can pass through the filter body more smoothly as a whole, thereby improving the purification efficiency of the raw water and setting the overall flow direction of the raw water passing through the filter body, and wherein each packing member is installed and fixed between an external housing of the ceramic filter accommodated therein and the ceramic filter, so that sealing of the introduced raw water and the filtered water becomes more effective and thus it is very simple to assemble a membrane filtration module without leakage, but with safety and economic efficiency.

Technical Solution

To achieve the above objects, the present invention provides a ceramic filter membrane module including: a housing formed at an upper part thereof with an inlet in which a fluid to be filtered is introduced, formed at a lateral side thereof with a filtered water outlet through which a filtered water is discharged, formed at a lower part thereof with a residue drain hole for discharging a filtered residue, and provided at upper and lower parts thereof with an upper cover having the inlet and a lower cover having the residue drain hole, respectively; and a plurality of ceramic filters accommodated inside the housing at a predetermined interval to filter a fluid introduced into the housing.

In this case, it is preferable that the ceramic filter includes a filter body in which one through-hole is formed to vertically extend at a center of the filter body, first and second flow paths of a flow path, in which the first flow path includes a plurality of rows of first flow paths with opened upper and lower parts and the second flow path includes a plurality of rows of second flow paths with closed upper and lower parts around the thorough-hole, vertically extend along the through-hole while being alternately arranged at a predetermined interval in a forward and backward direction of the through-hole, and a drainage path connected with the plurality of rows of the second flow paths having the closed upper and lower parts formed to horizontally extend by a predetermined length in a direction from one side to the other side at a lateral side of the filter body; and a sealing part provided at the upper and lower parts of the plurality of rows of the second flow paths of the filter body, respectively, to close the upper and lower parts of the plurality of rows of the second flow paths.

And, it is preferable that the flow path of the filter body has a diameter of 2 mm-3 mm, a spacing distance between one flow path and another flow path is 0.6 mm-1.2 mm or less, the through-hole of the filter body has a diameter of 5 mm-15 mm, the drainage path of the filter body has a front and rear width of 2 mm-3 mm, and the drainage path of the filter body has a vertical length of 5 mm-30 mm.

Further, it is preferable that one coating layer of a titania-coating layer, a silica-coating layer and a zeolite-coating layer is formed on inner surfaces of the thorough-hole and the first flow path.

Furthermore, it is preferable that the ceramic filter membrane module includes: a packing member including an upper packing member and a lower packing member detachably fixed to an upper part and a lower part of the filter body respectively and sealing and separating the inlet, the filtered water outlet and the residue drain hole, and having a sectional shape of ⊤; a fixing plate including an upper fixing plate detachably fixed to an upper part of the upper packing member, having a fastening hole at a center, and having a guide hole around the fastening hole, and a lower fixing plate detachably fixed to lower part of the lower packing member and having a fastening hole at a center; and a fixing member including a bolt member and a nut screw-coupled to an upper part of the bolt member, in the member sequentially and vertically passes through a fastening hole of the lower fixing plate, a through-hole of the lower packing member and the filter body, and fastening hole of the upper packing member and the upper fixing plate.

Advantageous Effects

According to the present invention, it is possible to filter a fluid to be filtered, such as raw water, etc., with higher efficiency through a plurality of ceramic filters accommodated inside a housing. In addition, as a sectional area of a through-hole formed at a center of a filter body is larger than a sectional area of a flow path formed around the through-hole, a water pressure pushing the raw water is applied from the through-hole formed at the center of the filter body toward the outside of the filter body, such that the raw water can pass through the filter body more smoothly as a whole, and thus, the purification efficiency of the raw water can be improved and the overall flow direction of the raw water passing through the filter body can be set uniformly as well. As each packing member is installed and fixed between the housing and the ceramic filters, sealing of the incoming raw water and the filtered water becomes more effective, such that the risk of leakage can be significantly reduced, and as a plurality of ceramic filters are accommodated in a single housing, an installation area can be reduced to achieve an economic benefit.

DESCRIPTION OF DRAWINGS

FIG. 1 is a sectional view schematically showing a ceramic filter membrane module according to one embodiment of the present invention.

FIG. 2 is a sectional view taken along A-A line of FIG. 1.

FIG. 3 is a perspective view schematically showing a ceramic filter.

FIG. 4 is a sectional view taken along B-B line of FIG. 2.

FIG. 5 is a sectional view taken along C-C line of FIG. 3.

FIG. 6 is a perspective view schematically showing a state in which a packing member and a fixing plate are provided at an upper part and a lower part of a filter body.

FIG. 7 is an isolated perspective view of FIG. 4.

BEST MODE

Hereinafter, preferred embodiments of the present invention will be described in more detail based on the accompanying drawings. Of course, the scope of the present invention is not limited to the following examples, and can be variously modified by those skilled in the art without departing from the technical gist of the present invention.

FIG. 1 is a sectional view schematically showing a ceramic filter membrane module according to one embodiment of the present invention, and FIG. 2 is a sectional view taken along A-A line of FIG. 1.

According to one embodiment the present invention, the ceramic filter membrane module may roughly include a housing 2 and a ceramic filter 1 as shown in FIGS. 1 and 2.

First, the housing 2 may be formed at an upper part thereof with an inlet 3a, into which various types of fluids to be filtered, such as raw water including tap water, etc., may be introduced.

The housing 2 may be formed at a middle of one lateral side or the other lateral side thereof with an outlet 3c, from which the filtered fluid is discharged.

A residue drain hole 3b, from which residues such as leftover remaining after filtering are discharged, may be formed at a lower part of the housing 2.

Then, a plurality of the ceramic filters 1 may be vertically accommodated inside the housing 2 at a predetermined interval to filter the fluid introduced into the housing 2.

After that, a cover 3 may be detachably provided at an upper part and a lower part of the housing 2, respectively.

The cover 3 may include an upper cover 31 and a lower cover 32. The inlet 3a may be formed in the middle of the upper cover 31. The upper cover 31 may be provided while being detachably fixed to an upper edge of the housing 2 in various ways such as bolt fixation, etc.

A residue drain hole 3b for discharging residues such as a leftover remaining after filtering may be formed in the middle of the lower cover 32.

The lower cover 32 may be provided while being detachably fixed to a lower edge of the housing 2 in various ways such as bolt fixation, etc.

A leakage prevention member 33, which may be formed with a ring-shaped O-ring, etc., to prevent a fluid such as raw water, etc., from leaking in an outer direction of the housing 2, may be provided between an edge of the upper cover 31 and an upper edge of the housing 2, and between an edge of the lower cover 32 and a lower edge of the housing 2.

A support plate 21 for supporting the ceramic filter 1 may be horizontal formed inside the housing 2.

The support plate 21 may include an upper support plate 211 and a lower support plate 212.

The upper support plate 211 may be horizontally formed at an inner upper side of the housing 2.

The plurality of ceramic filters 1 may vertically pass through the upper support plate 211 at a predetermined interval.

As a sectional shape of one side of an upper packing member 310 and a sectional shape of the other side of the upper packing member 310 to be described later, which are provided between the upper support plate 211 and an upper part of the plurality of ceramic filters 1, are respectively formed in a shape of "⊤", the upper packing member 310 may adhere to the upper support plate 211 and the upper part of the plurality of ceramic filters 1, respectively, thereby completely shutting off the fluid such as raw water, etc., from passing between the upper packing member 310 and the upper support plate 211.

The lower support plate 212 may be horizontally formed at an inner lower side of the housing 2.

The plurality of ceramic filters 1 may vertically pass through the lower support plate 212 at a predetermined interval.

As a sectional shape of one side of a lower packing member 320 and a sectional shape of the other side of the lower packing member 320 to be described later, which are provided between the lower support plate 212 and an upper part of the plurality of ceramic filters 1, are respectively formed in a shape of "⊥", the lower packing member 320 may adhere to the lower support plate 212 and the lower part of the plurality of ceramic filters 1, respectively, thereby completely shutting off the fluid such as raw water, etc., from passing between the lower packing member 320 and the lower support plate 212.

If the fluid, which is introduced into the inlet 3a of the cover 3 and may include raw water, etc., to be filtered, is introduced into a through-hole 110 and a flow path 120 of the filter body 10 to be described later in the ceramic filter 10 through a guide hole 412 of the upper fixing plate 410 and a guide port 330 of the upper packing member 310 to be described later in the ceramic filter 1, the fluid may be discharged as a filtered state from the through-hole 110 of the filter body 10 in an outer direction of the filter body 10 through the drainage path 130 to be described later by a water pressure of the raw water introduced into the through-hole 110.

The filtered water discharged as a filtered state through the discharge path 130 in an outer direction of the filter body 10 may pass through a space (S) around the filter body 10 to be discharged through the outlet 3c in an outer direction of the housing 2.

According to the present invention configured as above, it is possible to filter a fluid to be filtered, which may include various types such as raw water, etc., like tap water, etc., with higher efficiency through a plurality of ceramic filters 1 accommodated inside the housing 2. In addition, as sectional area of a through-hole 110 formed at a center of the filter body 10 to have the fluid pass through the through-hole 110 is larger than a sectional area of a flow path 120 formed around the through-hole 100, a pressure of the fluid passing through the through-hole 100 of the filter body 10 may be larger than a pressure of the fluid passing through flow path 120. Accordingly, if raw water such as tap water, etc., passes through the through-hole 110 and the flow path 120 of the filter body, a water pressure of the raw water passing through the through-hole 110 may be larger than a water pressure of the raw water passing through the flow path 120. Thus, a water pressure pushing the raw water is applied from the through-hole 110 formed at the center of the filter body 10 toward an outer direction of the filter body 10, such that the raw water can pass through the filter body 10 more smoothly as a whole. Accordingly, there is an advantage that the purification efficiency of the raw water can be improved and the overall flow direction of the raw water passing through the filter body 10 can be set uniformly as well.

FIG. 3 is a perspective view schematically showing a ceramic filter, FIG. 4 is a sectional view taken along B-B line of FIG. 3, and FIG. 5 is a sectional view taken along C-C line of FIG. 3.

Next, the ceramic filter 1 may mainly include a filter body 10 and a sealing part 20 as shown in FIGS. 3 to 5.

First, a through-hole 110 vertically extending along the filter body 10 may be formed to vertically extend at the center of the filter body 10.

A plurality of flow paths 120 may be formed in an area of the filter body 10 around the through-hole 110.

As shown in FIG. 4, a plurality of the flow paths 120 may be roughly formed in an area of the filter body 10 around the through-hole 110 at a predetermined interval in a direction from one side to the other side of the filter body 10, and may include a plurality of rows of first flow paths 121 and a plurality of rows of second flow paths 122, which vertically extend along the through-hole 110.

The plurality of rows of the first flow paths 121 may have the opened upper and lower parts and the plurality of rows of the second flow paths 122 may have the closed upper and lower parts.

The plurality of rows of the first flow paths 121 and the plurality of rows of the second flow paths 122 may be formed at a predetermined interval in an area of the filter body 10 around the through-hole 110 while being alternately arranged in a forward and backward direction of the through-hole 110.

A plurality of slit-type drainage paths 130 vertically extending along the filter body 10 by a predetermined length may be formed at a lateral side of the filter body 10 at a certain interval in a vertical direction of the filter body 10. As one example, the discharge path 130 may be formed at an upper lateral side, a middle lateral side and a lower lateral side of the filter body 10, respectively.

The drainage path 130 may be formed to horizontally extend by a predetermined length in a direction from one side to the other side of the filter body 10 so as to be connected with the plurality of rows of the second flow paths 122 having the closed upper and lower parts.

Then, as shown in FIG. 5, the sealing part 20 is provided to close the upper and lower parts of the plurality of rows of the second flow paths 122 while being respectively inserted into and fixed to the upper and lower parts of the plurality of rows of the second flow paths 122 in the filter body 10, so that the sealing part 20 may be positioned in an upper direction of the drainage path 130 formed at an upper lateral side of the filter body 10 and in a lower direction of the drainage path 130 formed at a lower lateral side of the filter body 10, respectively.

The sealing part 20 may be made of various materials, such as a ceramic material or a synthetic resin material, etc., such as plastic, curable resin, etc.

Then, in order to enhance purification efficiency of the fluid such as raw water, etc., and prevent the durability of the filter body 10 from declining, it is preferable that the flow path 120 of the filter body 10 has a diameter ($D_1$ of FIG. 4) of 2 mm-3 mm and a spacing distance (G of FIG. 4) between one flow path 120 and another flow path 120 is 0.6 mm-1.2 mm or less.

If the flow path 120 has a diameter ($D_1$) of less than 2 mm and a spacing distance (G) between one flow path 120 and another flow path 120 is less than 0.6 mm, there is a problem of causing a decline in the durability of the filter body 10 due to an excessively small diameter (D) of the flow path 120.

If the flow path 120 has a diameter ($D_1$) of more than 3 mm and a spacing distance (G) between one flow path 120 and another flow path 120 is more than 1.2 mm, the flow path 120 has an excessively large diameter ($D_1$), thereby reducing an amount of raw water passing through the flow path 120 around the through-hole 110. Further, there is a problem of increasing a permeation resistance of the fluid and decreasing purification efficiency when the raw water introduced into the through-hole 110 passes through the filter body 10.

Then, it is preferable that the through-hole 110 of the filter body 10 has a diameter ($D_2$ of FIG. 4) of 5 mm-15 mm, in order to prevent a decline in an effect of a pressure such as a water pressure, etc., applied to push the fluid such as raw water, etc., from the through-hole 110 in an outer direction of the filter body 10 and enhance purification efficiency of the fluid such as raw water, etc.

If the through-hole 110 has a diameter ($D_2$ of FIG. 4) of less than 5 mm, the through-hole 110 has an excessively small sectional area, thereby decreasing an amount of the fluid such as raw water, etc., passing through the through-hole 110 and reducing a pressure such as a water pressure, etc., of the fluid such as raw water, etc., passing through the through-hole 110. Thus, there is a problem of causing a decline in an effect of a pressure such as a water pressure, etc., applied to push the fluid such as raw water, etc., from the through-hole 110 in an outer direction of the filter body 10.

If the through-hole 110 has a diameter ($D_2$ of FIG. 4) of more than 15 mm, the through-hole 110 has an excessively large sectional area, thereby forming a relatively small number of the flow paths 120 in an area of the filter body 10 around the through-hole 110. Thus, there is problem of decreasing purification efficiency of the fluid such as raw water, etc.

Then, it is preferable that the drainage path 130 of the filter body 10 has a front and rear width (W of FIG. 3) of 2 mm-3 mm and the drainage path 130 of the filter body 10 has a vertical length (L of FIG. 3) of 5 mm-30 mm, in order to enhance purification efficiency of the fluid such as raw water, etc., in the drainage path 130 and reduce preparation costs of the filter body 10.

The ceramic filter 1 may be prepared by a conventional method for extruding ceramic. In general, alumina having an average particle size (d50) of 1-100 μm, a small amount of inorganic and organic binders, water, etc., may be mixed and kneaded to prepare a base soil, after which the base soil may be extruded and dried to make a ceramic filter green body, and the ceramic filter green body is subject to a sintering process, a cutting process, etc., thereby completing a ceramic filter.

Then, to greatly enhance purification efficiency of the fluid such as raw water, etc., passing through the flow path 120, although not shown in the drawings, it is more preferable that a coating layer of titania, silica or zeolite having a particle size remarkably smaller than that of a ceramic filter base is formed on an inner surface of the flow path 120 in order to exclude the leftovers (residues) introduced while being mixed in raw water, etc.

A coating layer of the titania, etc., may be formed on an inner surface of the plurality of rows of the first flow paths 121 or on an inner surface of the through-hole 110. A particle size of titania used in the coating layer is not particularly limited, but titanic powder having an average particle size of 0.1-1 μm may be generally used. The above titania powder may be adjusted to have a particle size having such an uniform distribution that may be suitable for filtering and advantageous for coating through particle pulverization by a ball mill, etc.

FIG. 6 is a perspective view schematically showing a state in which a packing member and a fixing plate are provided at an upper part and a lower part of a filter body, respectively, and FIG. 7 is an isolated perspective view of FIG. 4.

Then, a packing member 30, a fixing plate 40 and a fixing member 50 may be further provided as shown in FIGS. 6 and 7.

The packing member 30 may be made of various materials including elastic materials, etc., such as silicone, rubber, etc.

The packing member 30 may include an upper packing member 310 having a ring-shaped horizontal packing 30a and a ring-shaped vertical packing 30b vertically formed as a one-piece at a lower part of the ring-shaped horizontal packing 30b; and a lower packing member 320 formed to be vertically symmetrical to the upper packing member 310.

The upper packing member 310 may be closely fixed to an upper part of the filter body 10 in a detachable way.

As shown in FIG. 1, the horizontal packing 30a of the upper packing member 310 may be closely fixed to an upper part of the upper support plate 211 at a predetermined interval.

As shown in FIG. 1, the vertical packing 30b of the upper packing member 310 may be closely fixed to an inner side of the upper support plate 211 around the filter body 10, while passing through the upper support plate 211 at an outer lateral side of the filter body 10.

The lower packing member 320 may be closely fixed to a lower part of the filter body 10 in a detachable way.

As shown in FIG. 1, the horizontal packing 30a of the lower packing member 320 may be closely fixed to a lower part of the lower support plate 212 at a predetermined interval.

As shown in FIG. 2, the vertical packing 30b of the lower packing member 320 may be closely fixed to an inner side of the lower support plate 212 around the filter body 10 to passing through the lower support plate 212.

A guide port 330 connected with the through-hole 110 and the flow path 120 of the filter body 10 may be formed at a center of the upper packing member 310 and at a center of the lower packing member 320.

The fixing plate 40 may be made of various materials such as a metal material, etc.

The fixing plate 40 may include an upper fixing plate 410 and a lower fixing plate 420.

The upper fixing plate 410 may be seated and closely fixed to an upper part of the upper packing member 310 in a detachable way.

A fastening hole 411 may be formed at a center of the upper fixing plate 410.

A guide hole 412 may be radially formed at a predetermined interval in an area of the upper fixing plate 410 around the fastening hole 411.

The lower fixing plate 420 may be closely fixed to a lower part of the lower packing member 320 in a detachable way.

A fastening hole 421 may be formed at a center of the lower fixing plate 420.

The fixing member 50 may include a bolt member 510 and a nut 520.

The bolt member 510 may sequentially and vertically pass through the fastening hole 421 of the lower fixing plate 420, the guide port 330 of the lower packing member 320, the through-hole 110 of the filter body 10, the guide port 330 of the upper packing member 310, and the fastening hole 411 of the upper fixing plate 410.

The bolt member 510 may be formed to have a diameter smaller than the diameter ($D_2$) of the through-hole 110) of the filter body 10).

The nut 520) may be screw-fastened to an upper part of the bolt member 510) and may be closely fixed to a center of an upper part of the upper fixing plate 410).

INDUSTRIAL APPLICABILITY

According to the present invention, it is possible to filter a fluid to be filtered, such as raw water, etc., with higher efficiency through a plurality of ceramic filters accommodated inside housing. In addition, as a sectional area of through-hole formed at a center of a filter body is larger than a sectional area of a flow path formed around the through-hole, a water pressure pushing the raw water is applied from the through-hole formed the center of the filter body toward the outside of the filter body, such that the raw water can pass through the filter body more smoothly as a whole, and thus, purification efficiency of the raw water can be improved and the overall flow direction of the raw water passing through the filter body can be set uniformly as well. As each packing member is installed and fixed between the housing and the ceramic filters, sealing of the incoming raw water and the filtered water becomes more effective, such that the risk of leakage can be significantly reduced, and as a plurality of ceramic filters are accommodated in a single housing, an installation area can be reduced to achieve an economic benefit.

The invention claimed is:

1. A ceramic filter membrane module comprising:
a housing formed at an upper part thereof with an inlet in which a fluid to be filtered is introduced, formed at a lateral side thereof with a filtered water outlet through which a filtered water is discharged, formed at a lower part thereof with a residue drain hole for discharging a filtered residue, and provided at upper and lower parts thereof with an upper cover having the inlet and a lower cover having the residue drain hole, respectively;
a plurality of ceramic filters accommodated inside the housing at a predetermined interval to filter a fluid introduced into the housing, each of the ceramic filters including a filter body in which one through-hole is formed to longitudinally extend at a center of the filter body and a sealing part provided at the upper and lower parts of the plurality of rows of the second flow paths of the filter body, respectively, to close the upper and lower parts of the plurality of rows of the second flow paths;
a packing member including an upper packing member and a lower packing member detachably fixed to an upper part and a lower part of the filter body respectively and sealing and separating the inlet, the filtered water outlet and the residue drain hole, and having a sectional shape of ⊥;
a fixing plate including an upper fixing plate detachably fixed to an upper part of the upper packing member, having a fastening hole at a center, and having a guide hole around the fastening hole, and a lower fixing plate detachably fixed to a lower part of the lower packing member and having a fastening hole at a center; and
a fixing member including a bolt member and a nut screw-coupled to an upper part of the bolt member, in which the bolt member sequentially and longitudinally passes through a fastening hole of the lower fixing plate, a through-hole of the lower packing member and the filter body, and a fastening hole of the upper packing member and the upper fixing plate.

2. The ceramic filter membrane module of claim 1, wherein the ceramic filter comprises:
first and second flow paths of a flow path, in which the first flow path includes a plurality of rows of first flow paths with opened upper and lower parts and the second flow path includes a plurality of rows of second flow paths with closed upper and lower parts around the thorough-hole, longitudinally extend along the through-hole while being alternately arranged at a predetermined interval in a forward and backward direction of the through-hole, and a drainage path communicating with the plurality of rows of the second flow paths having the closed upper and lower parts is formed to transversely extend by a predetermined length in a direction from one side to the other side at a lateral side of the filter body, wherein a sectional area of the through-hole formed at the center of the filter body to have the fluid pass through the through-hole is larger than a sectional area of the flow path formed around the through-hole formed at the center of the filter body.

3. The ceramic filter membrane module of claim 2, wherein the flow path of the filter body has a diameter of 2 mm-3 mm, a spacing distance between one flow path and another flow path is 0.6 mm-1.2 mm or less, the through-hole of the filter body has a diameter of 5 mm-15 mm, the drainage path of the filter body has a front and rear width of 2 mm-3 mm, and the drainage path of the filter body has a longitudinal length of 5 mm-30 mm.

4. The ceramic filter membrane module of claim 2, wherein one coating layer selected from a group of a titania-coating layer, a silica-coating layer and a zeolite-coating layer is formed on inner surfaces of the thorough-hole and the first flow path.

* * * * *